Jan. 8, 1929.
L. H. VOLD ET AL
1,698,326
MATERIAL MOVING MECHANISM FOR PUNCHING MACHINES
Filed April 10, 1926   3 Sheets-Sheet 2
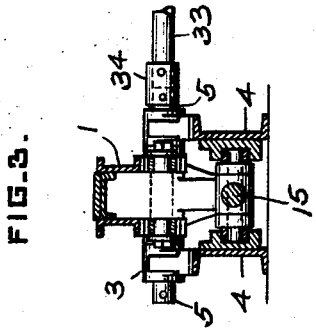
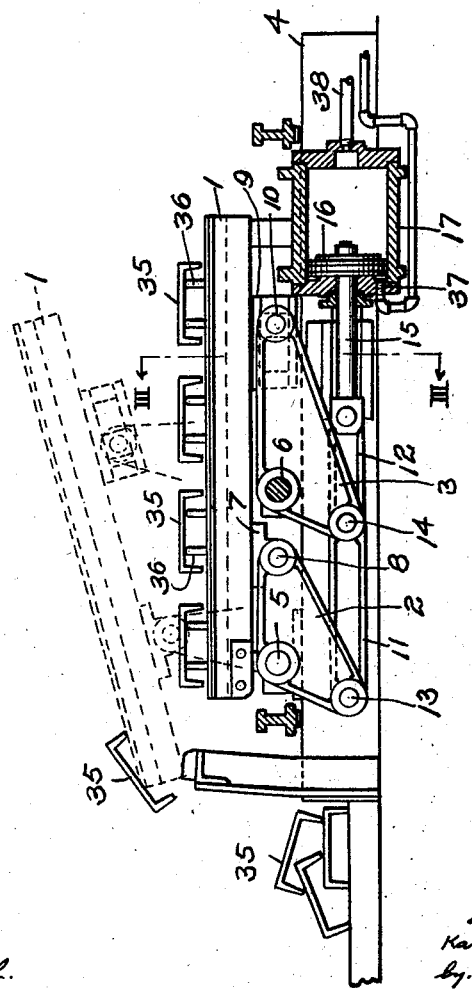

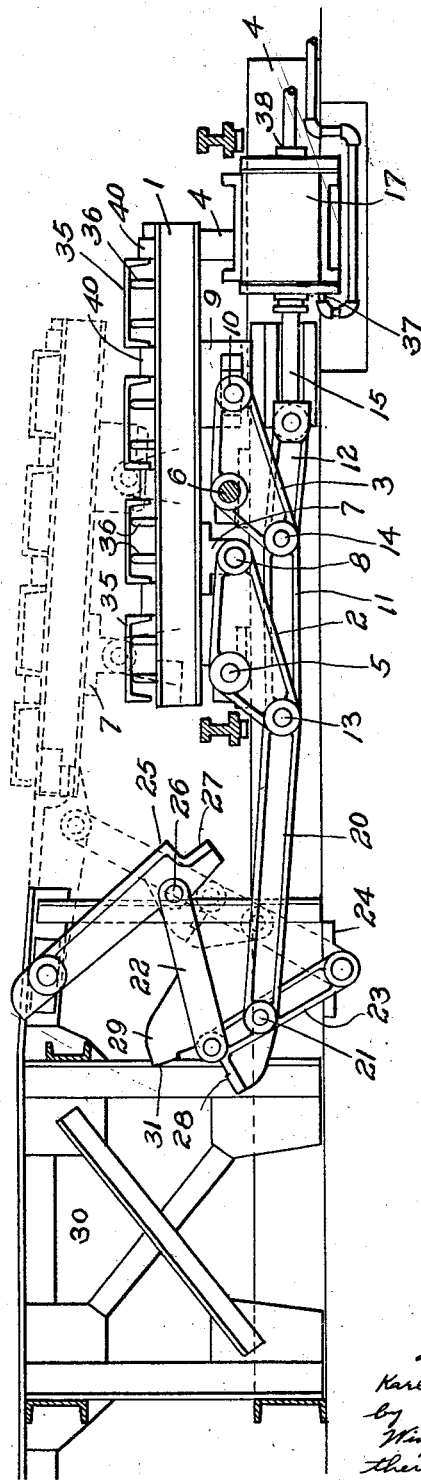

Jan. 8, 1929.  
L. H. VOLD ET AL  
1,698,326  
MATERIAL MOVING MECHANISM FOR PUNCHING MACHINES  
Filed April 10, 1926   3 Sheets-Sheet 3
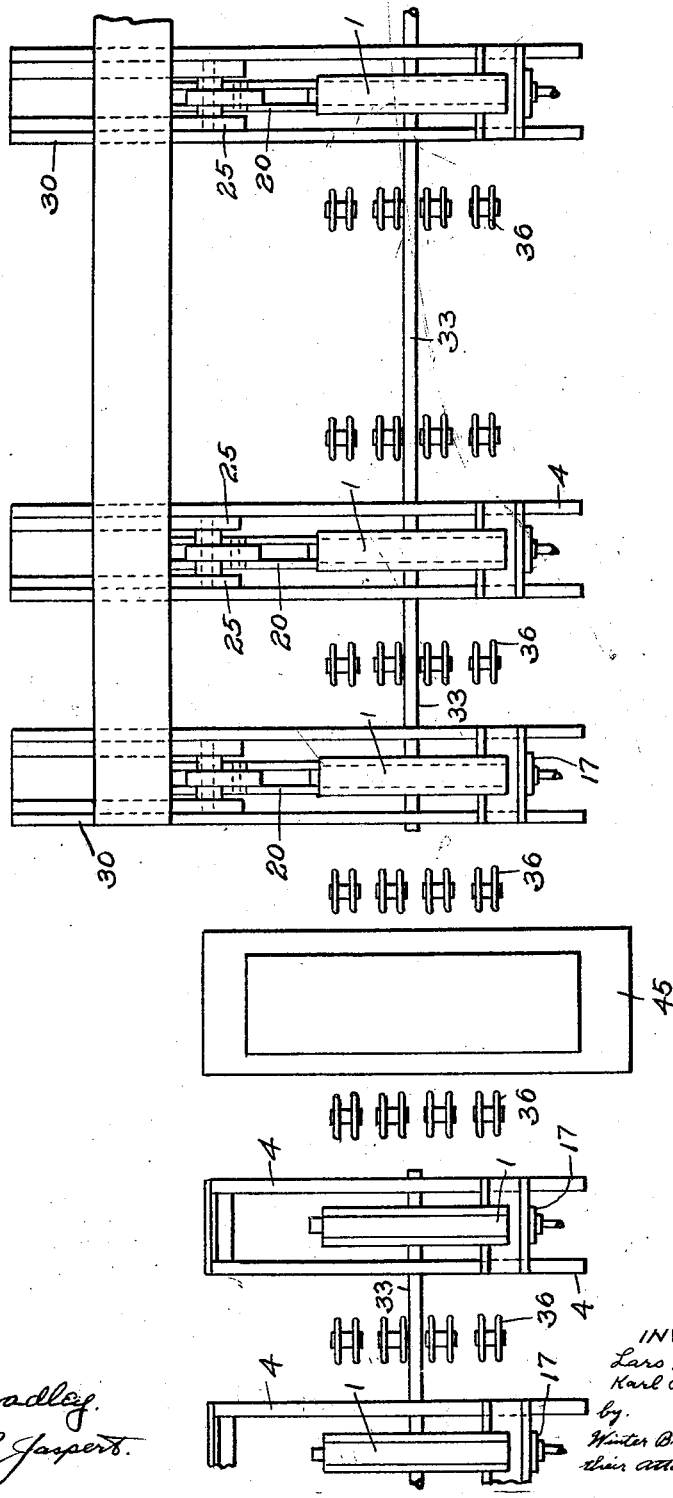

Patented Jan. 8, 1929.

UNITED STATES PATENT OFFICE.

LARS H. VOLD AND KARL R. HAMMERSTROM, OF BUTLER, PENNSYLVANIA.

MATERIAL-MOVING MECHANISM FOR PUNCHING MACHINES.

Application filed April 10, 1926. Serial No. 101,078.

Our invention relates to loading and unloading devices, more particularly to apparatus for manipulating large pieces of work such as structural iron elements to feed the latter into and away from machinery designed to act upon them.

It is among the objects of our invention to provide loading and unloading devices of the above designated character which shall comprise a minimum number of parts and which shall be adapted to be utilized in sets to accommodate them for the handling of work of various shapes and dimensions.

Another object of our invention is to provide loading and unloading devices of such character as will permit their ready cooperation with machine tools, adapted to act upon the work, and with loading and unloading platforms to facilitate the handling of the work passing through the machines, in an efficient and economical manner.

Still another object of our invention is to provide loading and unloading devices which shall embody means for adjusting the actuating mechanism to obtain the desired relative position and degree of inclination of the work carrying members with respect to the loading platforms and the locations in which the finished work is placed.

In the handling of relatively long structural elements such as channel beams, I-beams and the like, for machining operations, it is very difficult to handle the work in its manipulation around the machine element which is utilized to act upon it. Heretofore it has required the services of a relatively large number of helpers to manipulate structural elements, especially where a plurality of such elements were fed into a machine tool to be acted upon simultaneously.

It is a purpose of the present invention to eliminate the handling of the individual beams in placing them in their proper working alignment with the machine member and in unloading them after they have passed through the machine, and for this purpose we have provided a device which is adapted to be located to maintain its work-carrying member in proper working alignment with a loading platform, a machine tool and an unloading space in a manner as will be hereinafter set forth.

In the accompanying drawings constituting a part hereof, and in which like reference characters designate like parts, Fig. 1 is a side elevational view of a work-handling device embodying the principles of our invention associated with a loading mechanism and a platform; Fig. 2 is a similar view of the work-handling mechanism illustrating its adaptation to unloading; Fig. 3 is a cross sectional view thereof taken along the line III—III, Fig. 2; and Fig. 4 is a diagrammatic view of a plurality of loading and unloading devices, showing their relative positions and the manner of their alignment with a machine tool to which the work is advanced and from which it is removed.

The mechanism provided according to the invention may be used as a loading or an unloading device; in either case the apparatus operates according to the same principle. As shown in Figs. 1 and 2, the basic structure applicable to both uses comprises a work-carrying member 1, a plurality of levers 2 and 3, and a suitable support or base 4, the levers 2 and 3 being respectively pivoted at 5 and 6 to brackets carried by the support 4. The work-carrying member 1 is provided at its under side with a bracket 7 carrying trunnions or a shaft 8, by which the lever 2 is pivotally connected, and a guide bracket 9 having a movable guide block 10 to which the lever 3 is pivotally connected.

The levers 2 and 3 are pivotally connected to links 11 and 12 at 13 and 14 and the link 12 is connected to a piston rod 15 having a piston 16 disposed in the cylinder 17 of a power actuating device. Thus the work-carrying member has a fixed pivotal connection in the lever 2, and a floating, or sliding, pivotal connection through lever 3.

When applied as a loading device, the mechanism of Fig. 1 includes also a link 20 pivotally connected at 13 to lever 2 and link 11, the other end being pivotally connected at 21 to a lever 23, supported pivotally at one end in a bracket 24, and similarly connected at the other end to a link 22. An angularly movable bridge 25, pivotally supported by a loading platform 30 is pivotally connected at 26 to link 22, the end adjacent this connection is provided with a cut-away portion 27 adapted for engagement with the underside of the work-carrying member 1 when in its elevated position as shown in the dotted lines. The link 22 and lever 23 are provided with lugs 28 and 29 having complementary engaging faces 31 which function to support the link 22 and lever 23 when they form the toggle shown in dotted lines.

Referring to Fig. 3 a plurality of these work-handling units may be cooperatively engaged at one or both of their pivot supports 5 and 6 by securing an extension 33 thereto with a rigid coupling 34. Referring to Fig. 2 the operation of our device is briefly as follows: The solid lines show the work-handling member 1 in its normal stock-receiving position with the work comprising a plurality of channel beams 35 disposed on rollers 36 which are in permanent cooperative alignment with a machine tool such as a punch press or the like and the dotted lines indicate the extended position of the member 1 for unloading the channel beams 35 to one side. To raise the member 1 to its extended position the piston 16 is actuated by conducting pressure to the underside of the piston through the inlet 37 causing piston member 16 to traverse the full length of the cylinder 17 thus exerting a tension on the lever arms 2 and 3 which fulcrum about their pivot points 5 and 6 thereby raising the work-carrying member 1 to its elevated position as shown, this elevation of member 1 being accomplished in an arcuate manner longitudinally of the work-carrying member, as seen from the dotted line position of Fig. 2. The reverse operation is effected by admitting fluid pressure at the inlet 38.

It will be noted in Fig. 2 that from its pivot point 6 to its point of connection with the slide block 10 of the work-carrying member the lever 3 has a longer fulcrum arm than lever 2 so that the member 1 is raised to an inclined position thus permitting the channel beams 35 to slide off by the action of gravity. The length of the fulcrum arms of the levers may be reversed to produce an inclination in the opposite direction and in operation the difference in the lengths of the fulcrum arms is compensated for by means of the slide block connection of the lever with the work-carrying member.

When the mechanism is used for moving stock to a machine tool, the operation is similar to that described for unloading, the work-carrying member being raised and lowered in the same manner by applying fluid pressure to the piston. In this application when the member 1 is raised, the link 20 is subjected to tension, and actuates the associated lever mechanism to raise the bridge to cooperate with the work-carrying member in the manner clearly seen in the dotted line position of Fig. 1. As illustrated the member 1 when raised is shown in dotted lines to be inclined relative to the surface of the loading platform 30 to freely permit the sliding of the channel beams 35 from the platform 30 onto the work-carrying member, this inclination being secured by making the fulcrum arm of lever 2 longer than that of lever 3. For loading purposes the member 1 may be provided with a plurality of gage blocks 40 which are disposed between successive channel beams 35 and which are proportional in their thickness to the spacing of the rollers 36 so as to effect the proper alignment of the channel beams relative to each other and to the operating mechanism to which they are fed.

Referring to Fig. 4 of the drawings, a number of such work-handling devices are shown in a cooperative relation with a machine tool 45 to manipulate channel beams or other shapes by receiving them in the manner shown in Fig. 1 from a work loading platform 30 disposed on one side of the machine tool and placing them on the rollers 36 from which they are passed through the machine 45 and subsequently raised off the rollers 36 to the opposite side of the machine 45 and dumped in the manner shown in Fig. 2 either on the same side of the loading platform or on the other side of the machine 45.

It is evident from the foregoing description of our invention that a loading and unloading apparatus made in accordance therewith is adapted for use in the handling of heavy relatively long structural members in connection with their fabrication by machine tools or the like, and that such apparatus may be adapted for use in connection with any shape of structural members or bars for any purpose where such functional characteristics as possessed by this device may be suitably employed. It is further evident that such an apparatus functions in a simple and economical manner and eliminates the necessity for manual labor to a great extent.

Although we have described a specific embodiment of our invention it will be obvious to those skilled in the art that various modifications may be made in the details of construction and in the arrangement of the several cooperating parts without departing from the principles herein set forth.

We claim:

1. The combination with a loading platform of a work-carrying member, actuating means for the latter to bring it in cooperative alignment with said platform and to adjust the work to its operative position, and a movable bridge adapted to cooperate with said platform and the said work-carrying member.

2. The combination with a loading platform of a work-carrying member, actuating means for the latter to bring it in cooperative alignment with said platform and to adjust the work to its operative position, and a movable bridge operatively connected to said actuating means.

3. The combination with a loading platform of a work-carrying member, actuating means for the latter to bring it in cooperative alignment with said platform and to adjust the work to its operative position, and a movable bridge pivotally mounted on said platform and operatively connected to said actuating means.

4. The combination with a loading platform of a work-carrying member, actuating means for the latter to bring it in cooperative alignment with said platform and to adjust the work to its operative position, and a movable bridge pivotally mounted on said platform and operatively connected to said actuating means adapted to engage said work-carrying member to provide an uninterrupted loading surface.

5. The combination with a loading platform of a work-carrying member, actuating means for the latter to bring it in cooperative alignment with said platform and to adjust the work to its operative position, and a movable bridge adapted to cooperate with said platform and the said work carrying member, said actuating means comprising a system of power actuated levers and links connected to said work-carrying member.

6. The combination with a loading platform of a work-carrying member and a connecting bridge therefor, a plurality of levers and links connecting said carrying member and said bridge, and actuating means for operating said levers and links to adjust said carrying member to its work-receiving and discharging position.

7. In a work-manipulating device, the combination of a work-carrying member, a plurality of bent lever linkages pivotally connected to said member and adapted to raise and lower said member, one of said levers having a fixed and a floating connection to said member, means for simultaneously actuating all of said levers, and pivotal connections between said levers and actuating means, whereby to raise and lower said work-carrying member in arcuate manner.

8. The combination set forth in claim 7, said levers being of different lengths, whereby to tilt the work-carrying member when in raised position.

9. The combination set forth in claim 7, said actuating means comprising a fluid-pressure operated piston and links connecting said piston and levers.

10. In a work-manipulating device, the combination of a work-carrying member, a fluid-pressure operated piston, links associated with said piston, and a plurality of separate bent lever linkages of different lengths pivotally disposed between said work-carrying member and links, one of said levers comprising a sliding block linkage sliding in said member.

In testimony whereof, we hereunto sign our names.

LARS H. VOLD.
KARL R. HAMMERSTROM.